(12) United States Patent
Yamamoto et al.

(10) Patent No.: US 7,137,010 B2
(45) Date of Patent: Nov. 14, 2006

(54) METHOD FOR OBTAINING A SOLUTION OF AN OPTIMIZATION PROBLEM

(75) Inventors: Yusaku Yamamoto, Tokyo (JP); Ken Naono, Tachikawa (JP); Satoshi Ito, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 727 days.

(21) Appl. No.: 09/918,642

(22) Filed: Aug. 1, 2001

(65) Prior Publication Data
US 2002/0157009 A1   Oct. 24, 2002

(30) Foreign Application Priority Data
Apr. 24, 2001   (JP)   ............................. 2001-125279

(51) Int. Cl.
    *G06F 11/30*   (2006.01)
(52) U.S. Cl. .................. 713/189; 713/190; 709/203
(58) Field of Classification Search ................. 713/190, 713/189; 709/223
    See application file for complete search history.

(56) References Cited

U.S. PATENT DOCUMENTS

| 5,963,731 A | 10/1999 | Sagawa et al. |
| 5,974,400 A * | 10/1999 | Kagami et al. ............... 705/26 |
| 6,996,236 B1 * | 2/2006 | England et al. ............. 380/213 |

OTHER PUBLICATIONS

Kawamura, Shin-ichi; Shimbo, Atsushi. Fast Server-Aided Secret Computation Protocols for Modular Exponentiation. IEEE. 1993.*
Ahituv, Niv.; Lapid, Yeheskel; Neumann, Seev. Processing Encrypted Data. Communications of the ACM. Sep. 1987.*
Casanova, Henri; Dongarra, Jack. NetSolve: A Network Server for Solving Computational Science Problems. Apr. 29, 1996.*
Matsumoto, Tsutomo; Kato, Koki; Imai, Hideki. Speeding up Secret Computations with Insecure Auxiliary Devices. Advances in Cryptology- Crypto '88, Springer-Verlag Berlin Heidelberg. 1990. pp. 497-506.*
Atallah, Mikhail; Rice, John R. Secure Outsourcing of Scientific Computations. Dec. 7, 1990.*
Abadi, Martin; Feigenbaum, Joan; Kilian, Joe. On Hiding Information from an Oracle. Computer and System Sciences. 1989.*

(Continued)

*Primary Examiner*—Emmanuel L. Moise
*Assistant Examiner*—Kevin Schubert
(74) *Attorney, Agent, or Firm*—Reed Smith LLP; Stanley P. Fisher, Esq.; Juan Carlos A. Marquez, Esq.

(57) ABSTRACT

Method of acquiring solution of an optimization problem, whereby information of problem and its solution is not delivered to solving system when requesting solving system to solve, and it is also made unnecessary to send ciphering key. Problem and ciphering key are input to client. Client generates nonsingular matrix P and permutation matrix Q by using ciphering key in conversion matrix generation routine, enciphers problem by using matrices P and Q in problem conversion routine, outputs enciphered problem from problem conversion routine to problem output interface, and sends enciphered problem from output interface to server via network. Server receives enciphered problem, finds solution in solving routine, outputs solution to solution output interface, and sends solution from solution output interface to client via network. Client receives solution in solution input interface, deciphers solution by using matrices P and Q in reverse conversion routine, and thereby obtains solution of original problem.

1 Claim, 13 Drawing Sheets

OTHER PUBLICATIONS

Feigenbaum, Joan. Encrypting Problem Instances. Advances in Cryptology. Springer-Verlag Berlin Heidelberg. 1986.*

H. Konno, Measurement and Management of Market Risk/Credit Risk using mathematical programming, Nov. 2000, pp. 6-7.

* cited by examiner

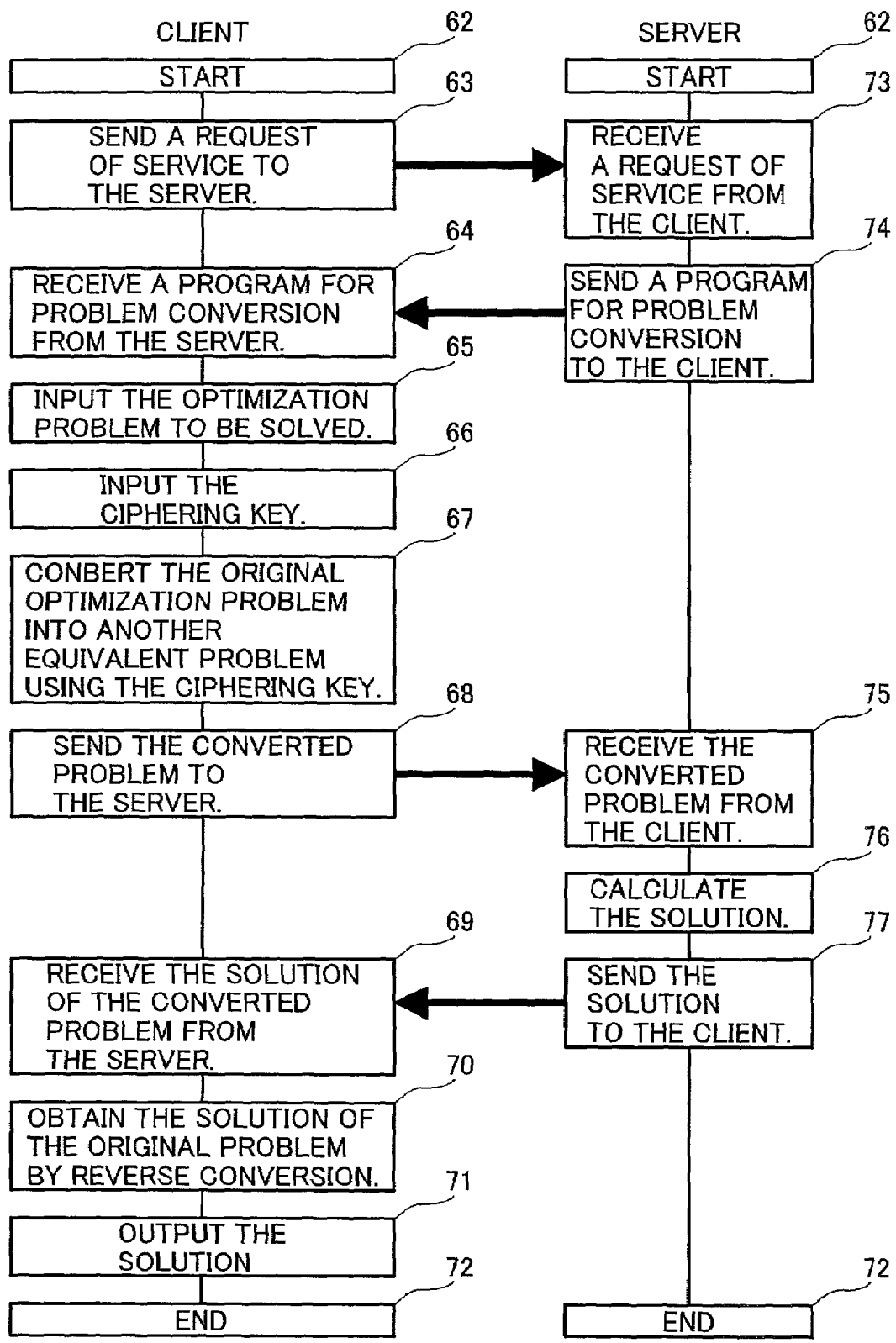

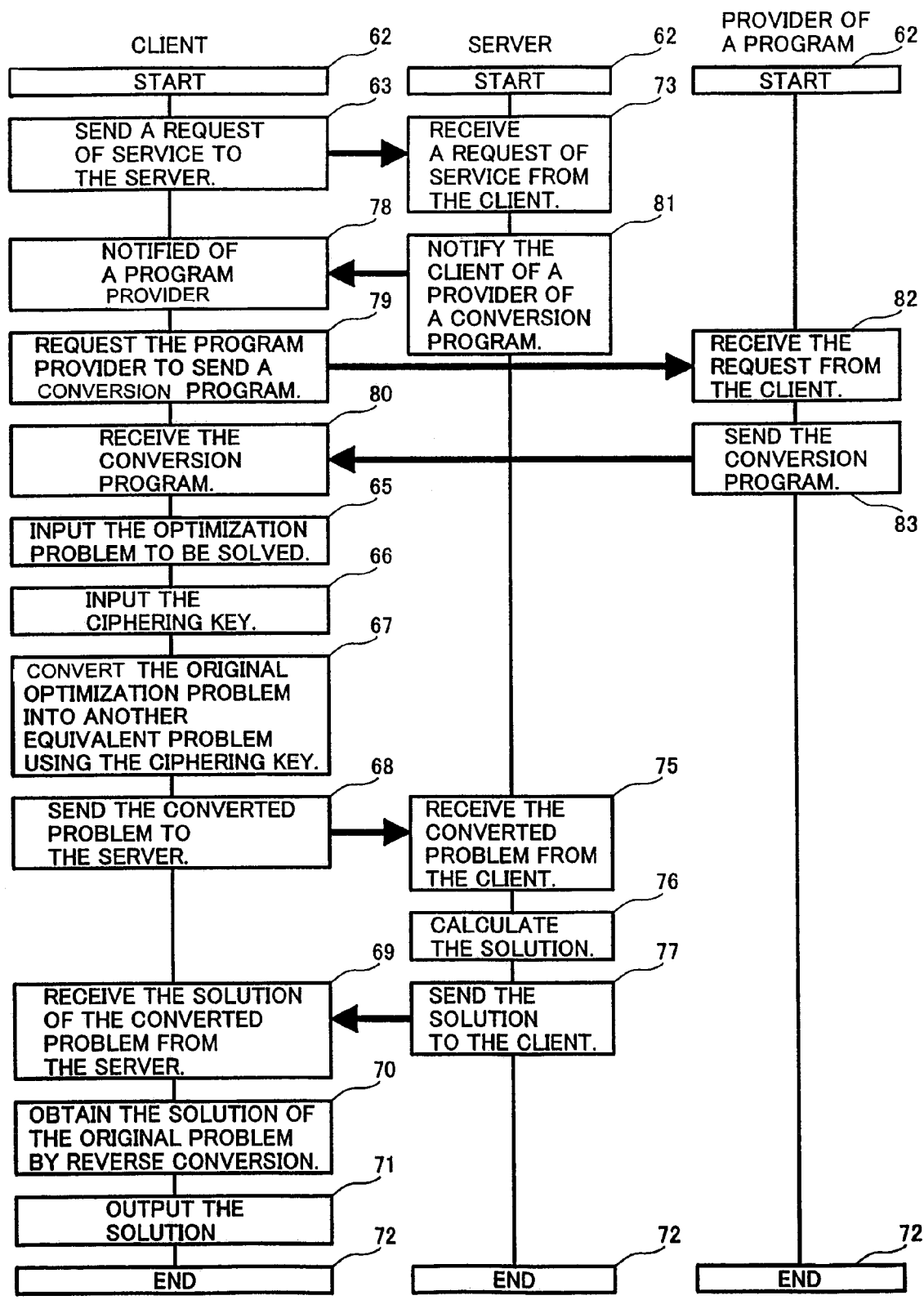

SOLUTION SERVICE FOR OPTIMIZATION PROBLEMS

IN THIS SITE, WE PROVIDE SOLUTION SERVICE FOR VARIOUS OPTIMIZATION PROBLEMS, INCLUDING OPTIMIZATION OF THE INVESTMENT STRATEGY AND THE DISTRIBUTION ROUTE OF PRODUCTS. TO KEEP THE SECRET OF OUR CUSTOMERS, WE USE A NEWLY DEVELOPED METHOD OF CIPHERING. USING THIS METHOD, YOU CAN NOT ONLY ENCIPHER YOUR PROBLEM AND SOLUTION WHILE THEY ARE TRANSMITTED THROUGH NETWORK, BUT ALSO PREVENT THE SERVER FROM KNOWING THEM.

IF YOU USE THIS SERVICE FOR THE FIRST TIME

85

REGISTRATION FOR MEMBERSHIP

IF YOU USE THIS SERVICE FOR THE FIRST TIME, CLICK HERE AND PROCEED TO REGISTRATION FOR MEMBERSHIP.

86

OBTAINING THE CIPHERING PROGRAM

WHEN YOU FINISHED REGISTRATION, CLICK HERE AND OBTAIN THE CIPHERING PROGRAM PROVIDED BY XXX SOFTWARE CORP. WE PROVIDE HIGH-LEVEL SECURITY USING THIS SOFTWARE.

87

FOR MORE EXPLANTION ABOUT THE CIPHERING PROGRAM, CLICK HERE.

FOR REGISTERED CUSTOMERS

88

CLICK HERE.

IF YOU HAVE FINISHED REGISTRATION FOR MEMBERSHIP AND HAVE OBTAINED THE CIPHERING PROGRAM, CLICK HERE TO PROCEED TO THE SERVICE MENU.

METHOD FOR OBTAINING A SOLUTION OF AN OPTIMIZATION PROBLEM

BACKGROUND OF THE INVENTION

The present invention relates to secret keeping in the case where a processor requests another processor to solve a problem and thereby obtains a solution of the problem.

For example, in financial business, it is necessary to conduct enterprise ranking, i.e., estimating enterprises having a high possibility of bankruptcy and enterprises having a low possibility of bankruptcy, in order to conduct risk management in finance for enterprises.

As one method therefor, a method utilizing an optimization problem has been proposed (see, for example, Hiroshi Konno, "Measurement and management of market risk/credit risk using mathematical programming", the 2000 fourth OR seminar text, Operations Research Society of JAPAN).

This method includes the steps of (1) plotting enterprises which are subjects of finance on a high-dimensional space according to financial indices such as the self capital ratio and cash flow; (2) calculating such a hyperplane that can discriminate bankrupt enterprises from non-bankrupt enterprises most accurately (i.e., with minimum discrimination errors) in the space on the basis of past actual results; and (3) ranking the subject enterprises on the basis of distances from the hyperplane.

As a matter of fact, information concerning the optimization problems includes secret information affecting the basis of business, such as delivery points and delivery routes in the distribution industry, and contents of bond portfolios, financial indices of financed enterprises, ranking information of financed enterprises, personal information for credit card examination, and results of examination in financial business.

Therefore, if there is a fear of leaking of these kinds of information by requesting the ASP to conduct optimization, requesting is hardly conceivable. For putting the ASP concerning solving of optimization problems to practical use, therefore, there is needed a method capable of ensuring sufficient secret keeping with respect to both information of optimization problems to be solved and information of obtained solutions.

As the method for this, a method proposed in, for example, U.S. Pat. No. 5,963,731 has mainly been used heretofore.

In the industry fields such as distribution industry and financial business, it is necessary to solve various optimization problems including optimization of delivery routes of a truck and optimization of bond portfolios.

For example, in optimization of the truck delivery route, a plurality of delivery points are given on a map, and there is found such a route that the truck passes each of the delivery points once and the length is minimized. As a result, the traveling distance can be shortened as far as possible, and the expense required for transport can be minimized.

As an example, it is now assumed that 100 delivery points are given on a plane. FIG. 2 shows a delivery route obtained when the truck goes around to all of the delivery points in a random order. FIG. 3 shows its optimum delivery route.

As compared with the delivery route in the random order, the traveling distance is reduced to a fraction in the optimum delivery route. The transport expense can be saved remarkably.

Furthermore, for example, in optimization of bond portfolios, there is given such a condition that a fund of a constant amount is given and dispersions of expected earning rates and earning rates are given with respect to bonds such as stocks, government bonds, and debentures. Under this condition, there is solved a problem as to how to dispersedly invest a fund to bonds in order to minimize the total risk, i.e., dispersion of earning rates while keeping the total earning rate constant.

These problems can be formulated mathematically as a linear programming problem, a quadratic programming problem, or a mixed integer programming problem.

A linear programming problem is a problem of finding x which minimizes an objective function $c^t x$ under an equality constraint $Ax=b$ and an inequality constraint $x \geq 0$.

Here, x is an n-dimensional vector of an unknown quantity. A is a constant matrix having m rows and n columns, and c is an n-dimensional constant vector. Furthermore, $x \geq 0$ represents a condition that all elements of x are not negative, and $c^t x$ represents an inner product of a vector c and a vector x.

A quadratic programming problem is an optimization problem obtained by changing an objective function of a linear programming problem into a quadratic function $c^t x + x^t B x$.

Here, B is a constant non-negative definite matrix having n rows and n columns.

A mixed integer programming problem is an optimization problem obtained by imposing an integer condition on partial components of a vector x of an unknown quantity in a linear programming problem.

The above described optimization of the delivery route of the truck becomes a mixed integer programming problem, because the condition that the truck passes each of the delivery points once can be represented by an equality constraint $Ax=b$ with an integer condition and the length of the delivery route can be represented by a linear function $c^t x$.

The above described optimization of bond portfolios becomes a quadratic programming problem, because the conditions that the amount of the fund is constant and the earning rate is constant can be represented by an equality constraint $Ax=b$ and an objective function for minimizing the risk can be represented by a quadratic function $x^t B x$.

SUMMARY OF THE INVENTION

In the conventional secret keeping method, it is possible to keep secrets of the problem to be solved and the solution against the interception by a third person on the network. However, this method has two problems.

A first problem is that deciphering is conducted on the solving system side such as the ASP conducts and consequently information of the problem to be solved and the solution is completely disclosed to the solving system. In the case where there is a malicious staff on the solving system side, or the case where there has been invasion to the solving system, therefore, there is a possibility that client information will leak.

A second problem is that besides enciphered information of the problem to be solved the ciphering key must also be sent to the solving system side in order to conduct deciphering on the solving system side. When sending a ciphering key, a contrivance to raise the safety is conducted in general by, for example, adopting a method of enciphering the ciphering key by using a different public key cipher. However, this requires extra labor, and the possibility of a public key cipher being broken is not zero. This results in lowering of safety as well.

An object of the present invention is to provide such a new secret keeping method that when requesting a solving system to solve an optimization problem, information of the problem to be solved and the solution is not delivered to the solving system side and it is made unnecessary to send a ciphering key on a network.

In order to achieve the object, in accordance with the present invention, a problem solution acquisition method whereby a problem is sent from a requesting system, which requests a solution of an input problem, to a solving system, and the solution of the problem is found in the solving system, sent to the requesting system and output from the requesting system, includes the steps of: enciphering, in the requesting system, an input problem by using a ciphering key; sending the enciphered problem to the solving system; solving, in the solving system, the sent enciphered problem while keeping the sent enciphered problem in an enciphered state, and finding a solution; sending the found solution to the requesting system; and deciphering, in the requesting system, the sent solution by using the ciphering key and outputting the deciphered solution from the requesting system.

In accordance with the present invention, an optimization problem solution acquisition method whereby an optimization problem is sent from a requesting system, which requests a solution of an input optimization problem, to a solving system, and a solution of the optimization problem is found in the solving system, sent to the requesting system and output from the requesting system, includes the steps of: converting, in the requesting system, the optimization problem into another optimization problem having a different equality $g'(y)=0$, a different inequality constraint $h'(y) \geqq 0$, and a different objective function $f'(y)$ by using a suitably determined variable conversion $y=u(x)$ and equivalent transformation of expressions; sending the converted optimization problem to the solving system; solving, in the solving system, the sent converted optimization problem, and finding a solution y; sending the found solution y to the requesting system; and conducting, in the requesting system, reverse conversion of the variable $x=u^{-1}(y)$ on the sent solution y, finding a solution x of the original optimization problem, and outputting the solution x from the requesting system.

An example of a space of financial indices and an optimum plane is shown in FIG. 4.

White circles 3 in FIG. 4 represent non-bankrupt enterprises, and black circles 4 represent bankrupt enterprises. A straight line 5 represents a discrimination hyperplane.

In this method, a linear programming problem is used in order to find an optimum hyperplane for discrimination in the step of (2). A similar technique is used for admission examination of personal credit cards and so on. In this way, solving of an optimization problem has exceeded the optimization of a narrow sense and has become a technique required in various scenes of the distribution industry and financial business.

In recent years, optimization problems to be solved in applications as described above have become large in scale and examples needing utilization of super computers are increasing, because of spread of large scale supply chain managements in the distribution industry and merger of banks in financial business.

Therefore, problem solving has become difficult if only computer resources possessed by each enterprise are utilized. There is expected advent of application service providers (ASPs) having a large scale super computer and undertaking solving of optimization problems from a plurality of enterprises.

A key to putting such an ASP to practical use is a countermeasure for keeping secrets.

An example of keeping secrets is shown in FIG. 5.

In this example, a computer system 6 of a client storing an optimization problem to be solved is coupled to a computer system 7 of an ASP for conducting problem solving via a network 8. In requesting the ASP to solve a problem, the client first enciphers a problem 9 to be solved by using a certain ciphering key 10 to obtain a bit stream 11. Subsequently, the client sends the bit stream 11 and the ciphering key 10 to the ASP side via the network 8. When sending the ciphering key, however, it is necessary to manage to prevent the ciphering key from being intercepted on the network by using such a method as to encipher the ciphering key with a cipher of a different public key system.

The ASP side receives the bit stream 11 and the ciphering key 10, deciphers them, restores the original problem, finds a solution 12 for the original problem, enciphers the solution 12 again, and sends back the enciphered solution to the client side via the network 8. The client side deciphers the solution, and obtains the solution for the original problem.

In this method, the problem to be solved and the solution are enciphered and transferred via the network. Even if the information on the network is intercepted by a third person, it will be difficult to obtain the information concerning the problem and the solution.

BRIEF DESCRIPTION OF THE DRAWING

FIG. 12 is a diagram showing a flow chart of client and server processing in a second embodiment;

FIG. 13 is a diagram showing a flow chart of client, server, and program provider processing in a third embodiment; and FIG. 14 is a diagram showing a picture example of a home page of a program provider.

DESCRIPTION OF THE EMBODIMENTS

Figure 1:
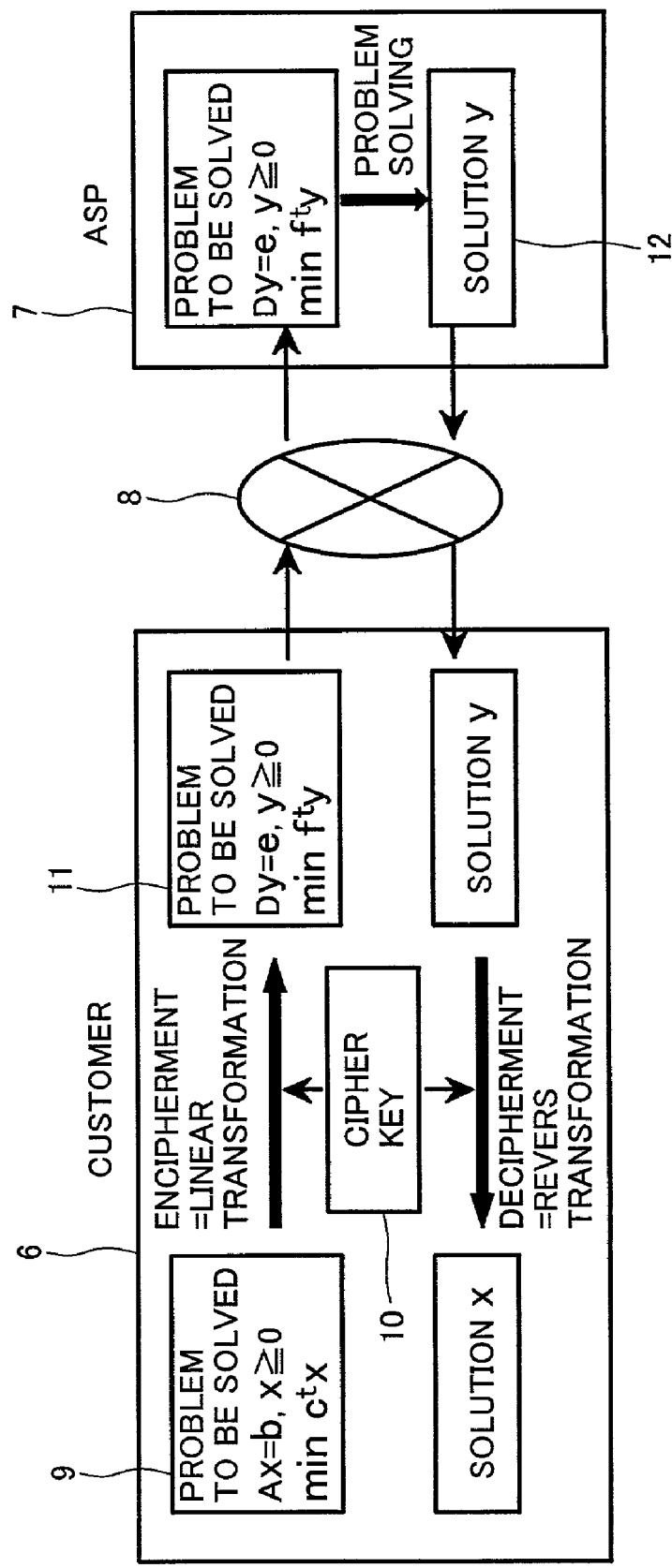
FIG. 1 is a diagram showing an outline of a secret keeping method according to the present invention.
Figure 2:
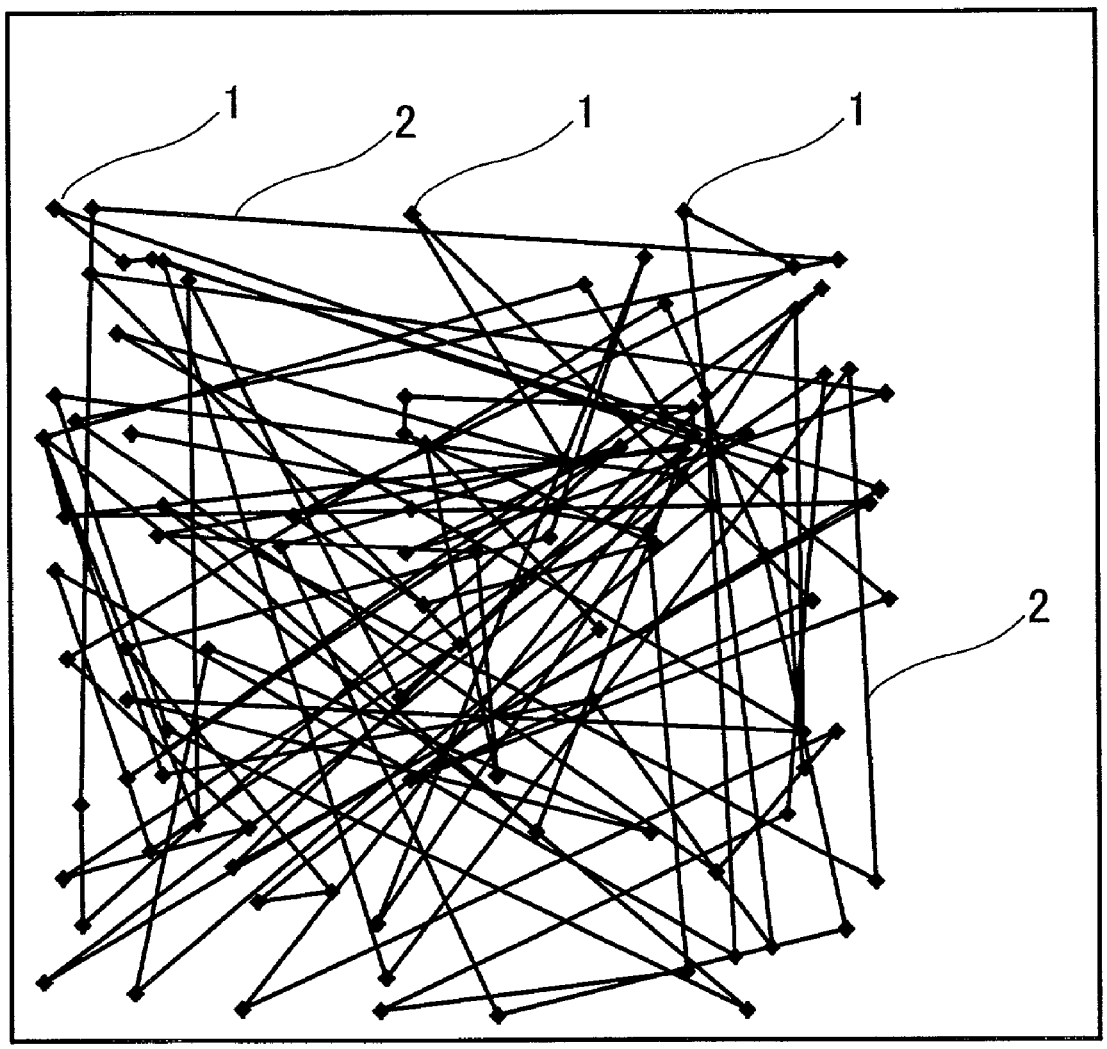
FIG. 2 is a diagram showing a deliver route of a truck in a random order.
Figure 3:
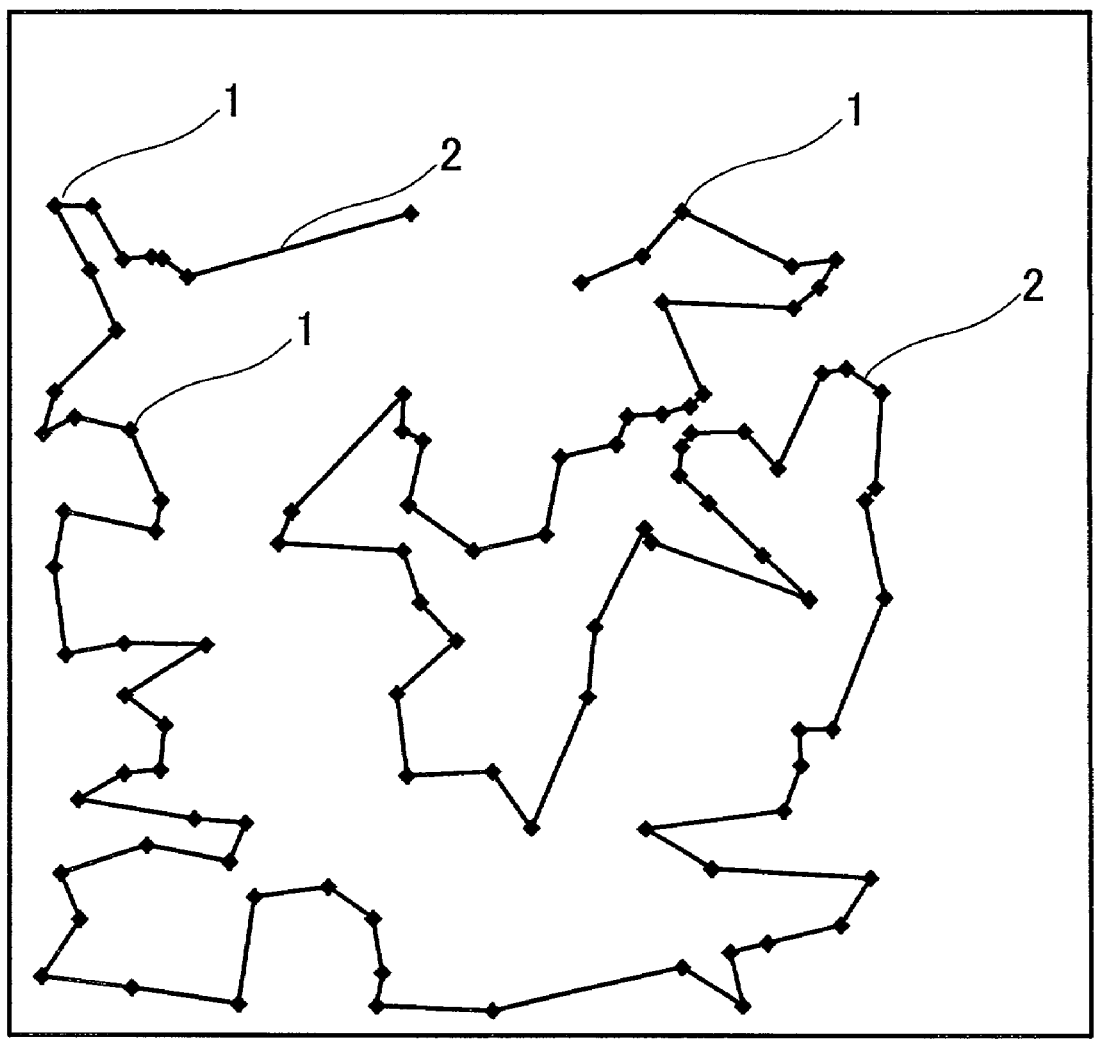
FIG. 3 is a diagram showing an optimum delivery route of a truck.
Figure 4:
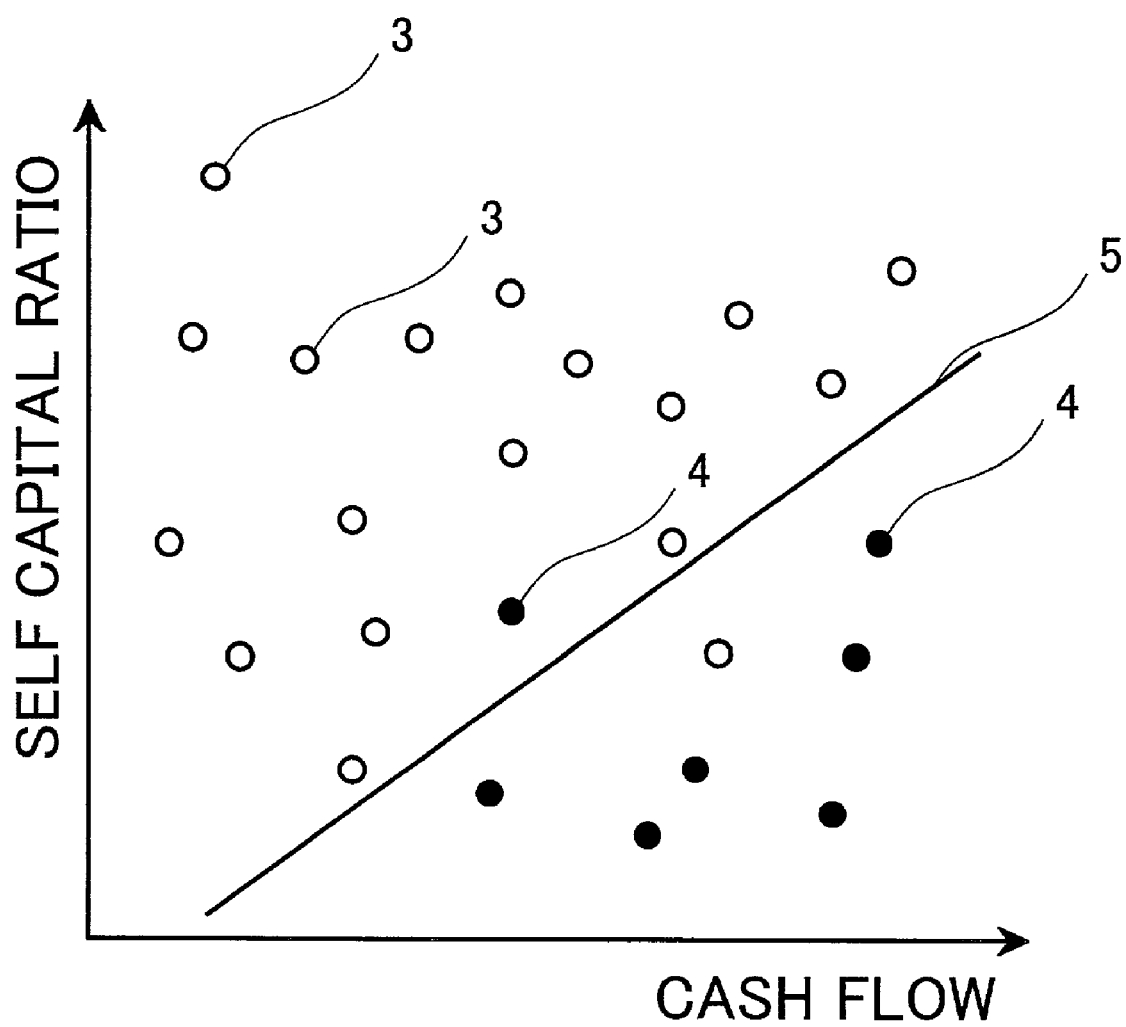
FIG. 4 is a diagram showing a space of financial indices and a discrimination plane of bankrupt enterprises and non-bankrupt enterprises.
Figure 5:
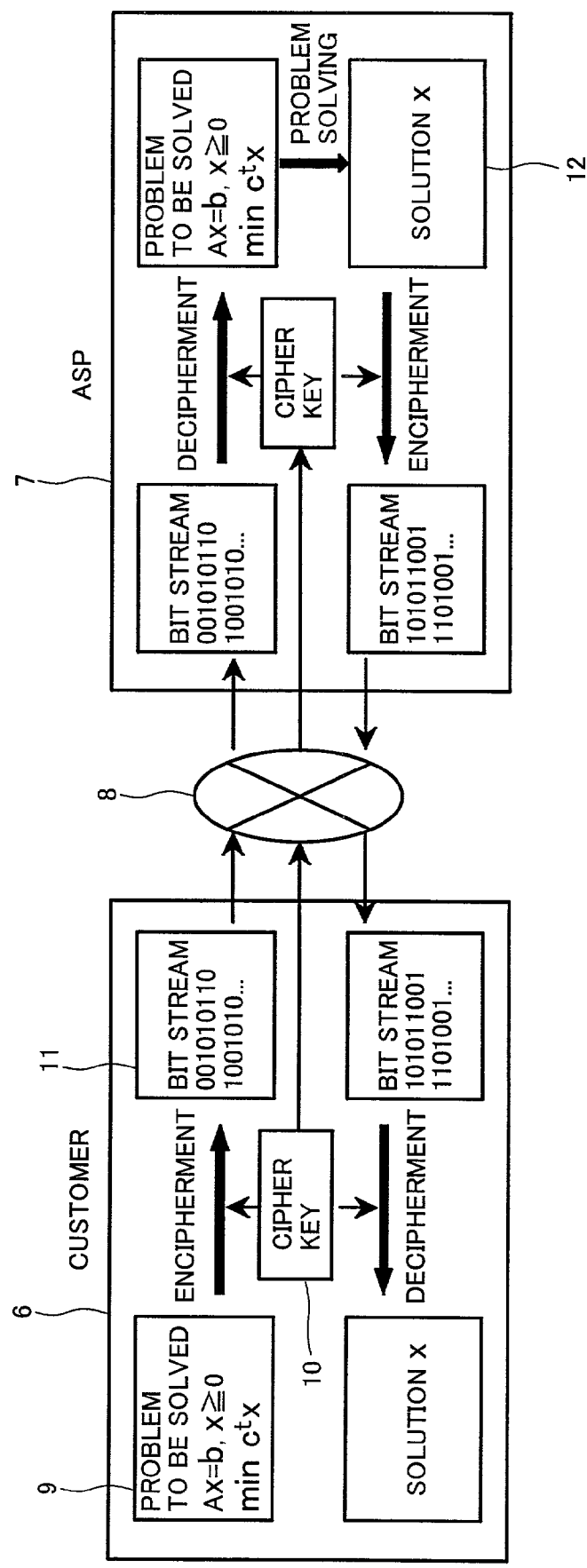
FIG. 5 is a diagram showing a secret keeping method.

Hereafter, the principle and a first embodiment of the present invention will be described in detail by referring to the drawing.

A system mentioned here includes a client computer system which accepts a solving request of an optimization problem from a user, a server computer system which obtains a solution of a given optimization problem, and a network which connects clients to the server. Without giving information of the original optimization problem and information concerning its solution, the system allows each client to request the server to solve an optimization problem, allows the server to obtain a solution of the requested problem and return the solution to the client, and allows the client to output the solution.

FIG. 1 is a diagram showing an outline of a secret keeping method of the present invention by taking the case of secret keeping between a client which requests solving of a problem and the ASP as an example.

A client computer system 6 enciphers a problem 9 to be solved by using a ciphering key 10, and sends the enciphered problem 11 to be solved to a computer system 7 of an ASP via a network 8.

The ASP computer system 7 solves a problem, finds a solution y, and sends the solution to the client computer system 6 via the network 8.

The client computer system 6 deciphers the solution y by using the ciphering key 10 and obtains a solution x.

The ASP side handles only the converted problem "minimize $f^t y$ s.t. Dy=e, y$\geq$0." Therefore, the ASP side does not obtain information concerning the original problem. Furthermore, since conversion of the original problem into a different problem is equivalent transformation, it is possible to obtain a solution of the original problem from the solution of a transformed problem.

Figure 6:
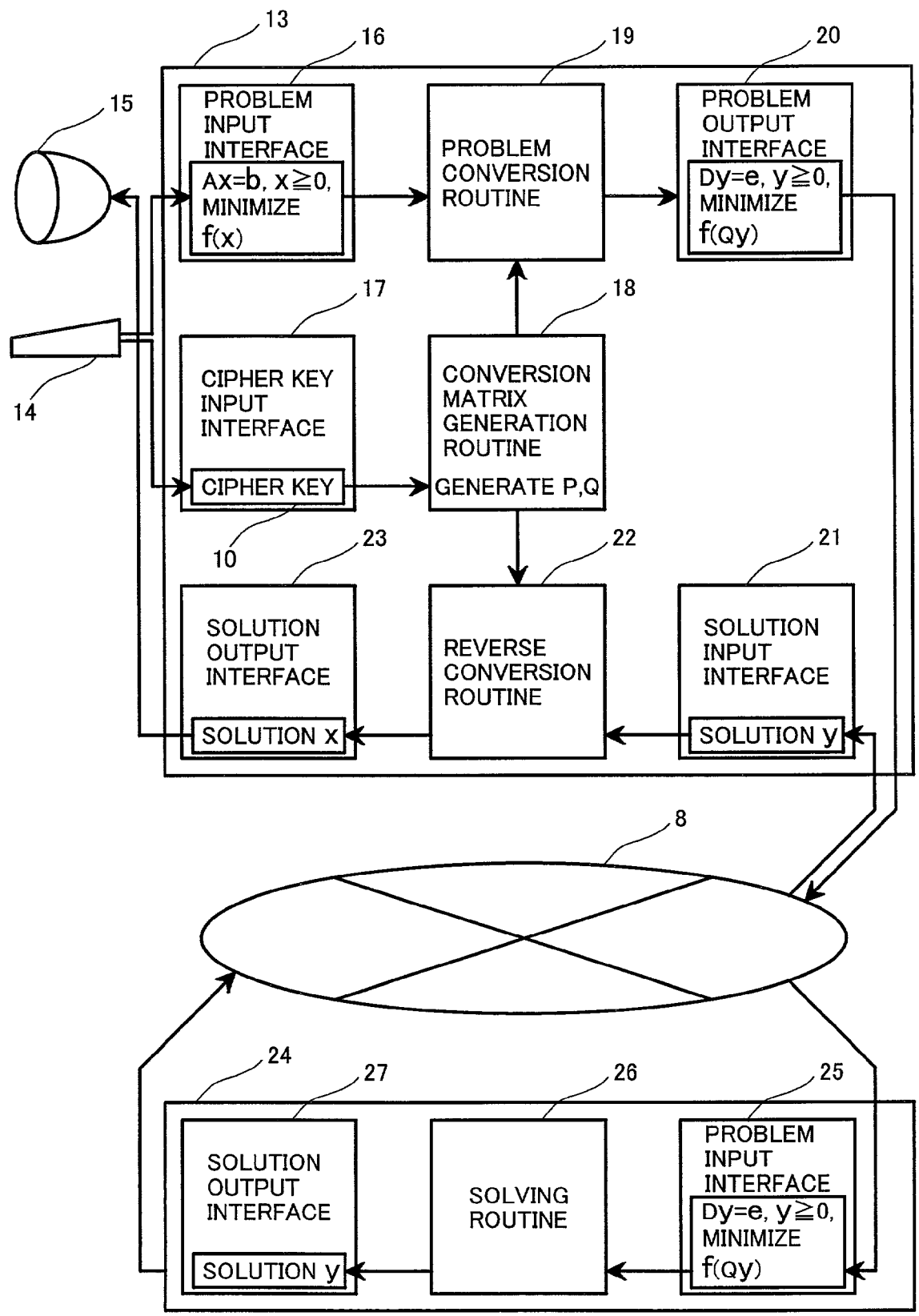
FIG. 6 is a diagram showing an example of a computer system which should execute an embodiment of the present invention.

A configuration diagram of the present system is shown in FIG. 6. Besides an input device 14 and an output device 15, a client computer system 13 includes:

(1) a problem input interface 16 for accepting an input of an optimization problem represented by an equality constraint Ax=b defined by a coefficient matrix A having m rows and n columns and an m-dimensional right hand side vector b, an inequality constraint x$\geq$0, and an objective function f(x) to be minimized;

(2) a ciphering key input interface 17 for accepting a ciphering key used for secret keeping;

(3) a conversion matrix generation routine 18 for generating a nonsingular matrix P having m rows and m columns and a permutation matrix Q having n rows and n columns by using a ciphering key 10 input from the ciphering key input interface 17;

(4) a problem conversion routine 19 for converting the optimization problem into a different optimization problem having a different equality constraint (PAQ)y=Pb, a different inequality constraint y$\geq$0, and a different objective function f(Qy), by using the nonsingular matrix P and the permutation matrix Q;

(5) a problem output interface 20 for sending the converted optimization problem to the server via a network 8;

(6) a solution input interface for receiving a solution y of the converted problem from the server via the network 8;

(7) a reverse conversion routine 22 for conducting reverse conversion x=Qy on the solution y by using the matrix Q generated in the step of (3) and finding a solution x of the original problem; and (8) a solution output interface 23 for outputting a solution x obtained after the reverse conversion.

PAQ represents multiplication of P, A and Q. Qy represents multiplication of Q and y.

A server computer system 24 includes:

(9) a problem input interface 25 for receiving the converted optimization problem from a client via the network 8;

(10) a solving routine 26 for finding a solution of the problem; and

(11) a solution output interface 27 for sending the found solution to the client via the network 8.

Figure 7:
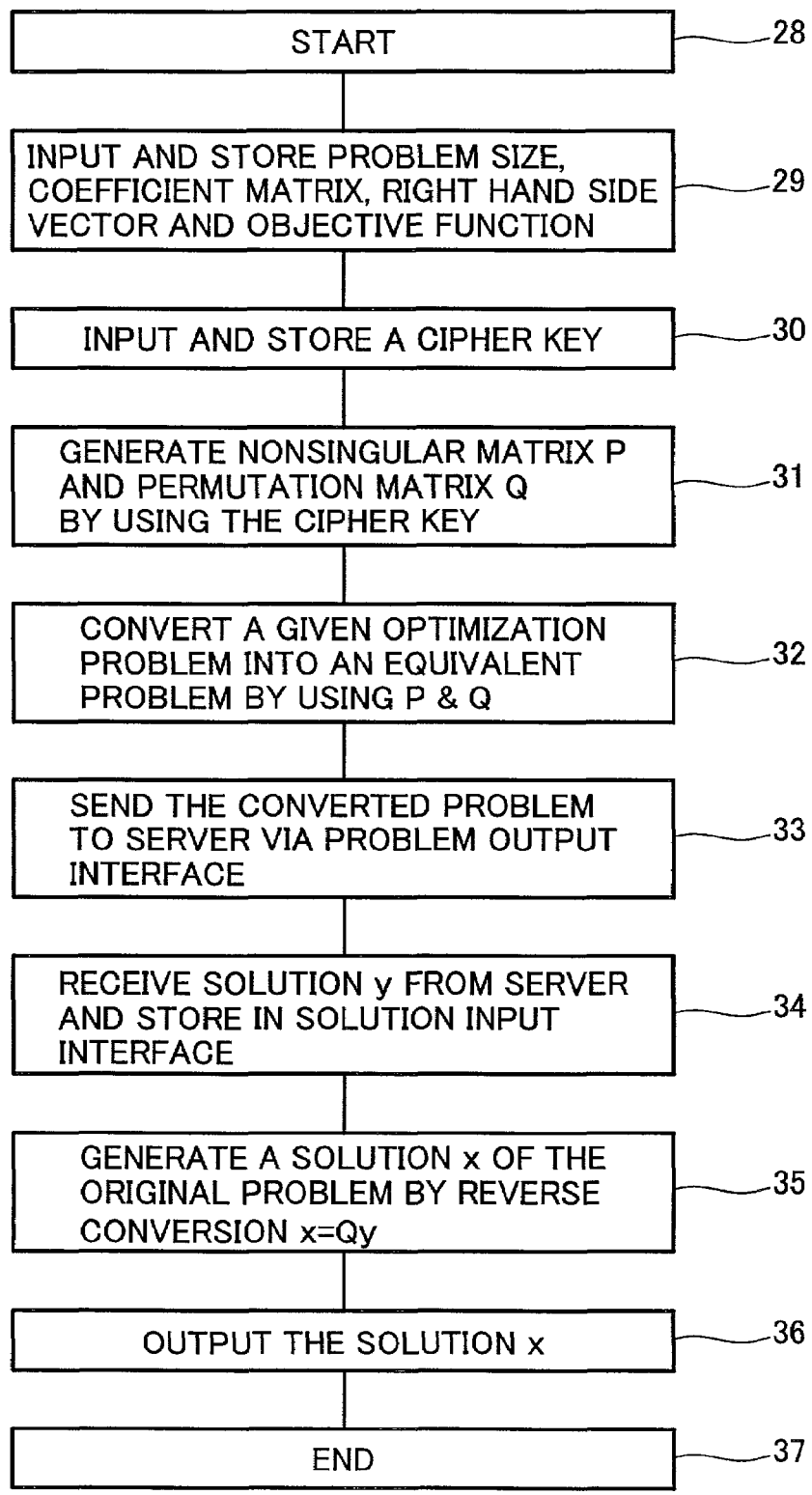
FIG. 7 is a diagram showing a flow chart of client processing in an embodiment.
Figure 8:
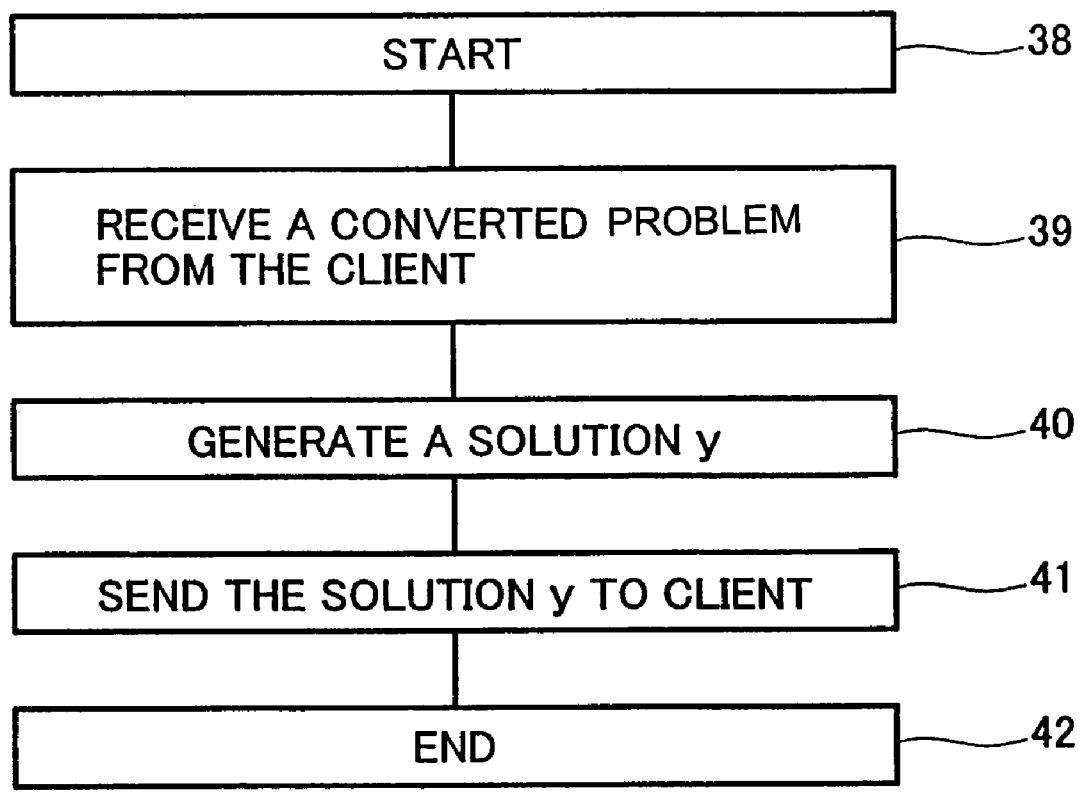
FIG. 8 is a diagram showing a flow chart of server processing in an embodiment.

Processing conducted on the client side in the present embodiment is shown in FIG. 7, and processing conducted on the server side in the present embodiment is shown in FIG. 8.

A client first accepts an input of an optimum problem from its user, and stores a problem size n and m, a coefficient matrix A, a right hand side vector b, and an objective function f(x), which are input, in the problem input interface (processing 29).

Subsequently, the client accepts an input of a ciphering key from the user, and stores the ciphering key in the ciphering key input interface (processing 30).

Subsequently, in the conversion matrix generation routine, the client generates a nonsingular matrix having m rows and m columns and a permutation matrix having n rows and n columns by using the ciphering key (processing 31).

Details of the method for generating the matrices P and Q will be described later.

Subsequently, in the problem conversion routine, the client conducts linear transformation $y=Q^{-1}x$ on a solution by using the permutation matrix Q, and conducts such a conversion as to multiply both hand sides of an equality constraint Ax=b by the nonsingular matrix P. Thus, the given problem is converted into an equivalent optimization problem having a different equality constraint Dy=e, a different inequality constraint y$\geq$0, and a different objective function g(y) (processing 32).

From the foregoing description, it is apparent that a matrix D, a vector e, and the function g are given by calculation equations D=PAQ, e=Pb, and g(y)=f(Qy), respectively.

Subsequently, the client stores the converted problem in the problem output interface, and sends the converted problem to the server via the network (processing 33).

By the way, the client sends only the converted problem to the server. The client does not send the ciphering key and the matrices P and Q, which have been used for the conversion.

Subsequently, the server receives the converted optimization problem from the client via the network (processing 39), stores it in the problem input interface, and finds its solution y in the solving routine (processing 40).

As for a method used to find the solution, an arbitrary existing solving method may be used according to the kind of the optimization problem.

For example, in the case of a linear programming problem, a simplex method can be utilized, and in the case of a quadratic programming program, a successive quadratic programming method can be utilized.

Details of these solving methods are described in Hiroshi Konno and Hiroshi Yamashita, "nonlinear programming," Nikka Giren Publication Company, 1987.

After having found the solution y, the server sends the solution y to the client via the network (processing 41).

Subsequently, the client receives the solution y of the converted optimization problem from the server via the network and stores it in the solution input interface (processing 34).

Subsequently, in the reverse conversion routine, the client conducts reverse conversion x=Qy on the solution by using the matrix Q, thus finds a solution x of the original problem, and stores it in the solution output interface (processing 35).

As for the matrix Q used here, the matrix generated at the time of conversion of the optimization problem may be kept and used. Alternatively, it is also possible to make the user input the ciphering key again and generate the matrix Q again in the conversion matrix generation routine by using the ciphering key.

Finally, the client outputs the solution of the original problem from the solution output interface (processing 36), and finishes the processing.

Figure 9:
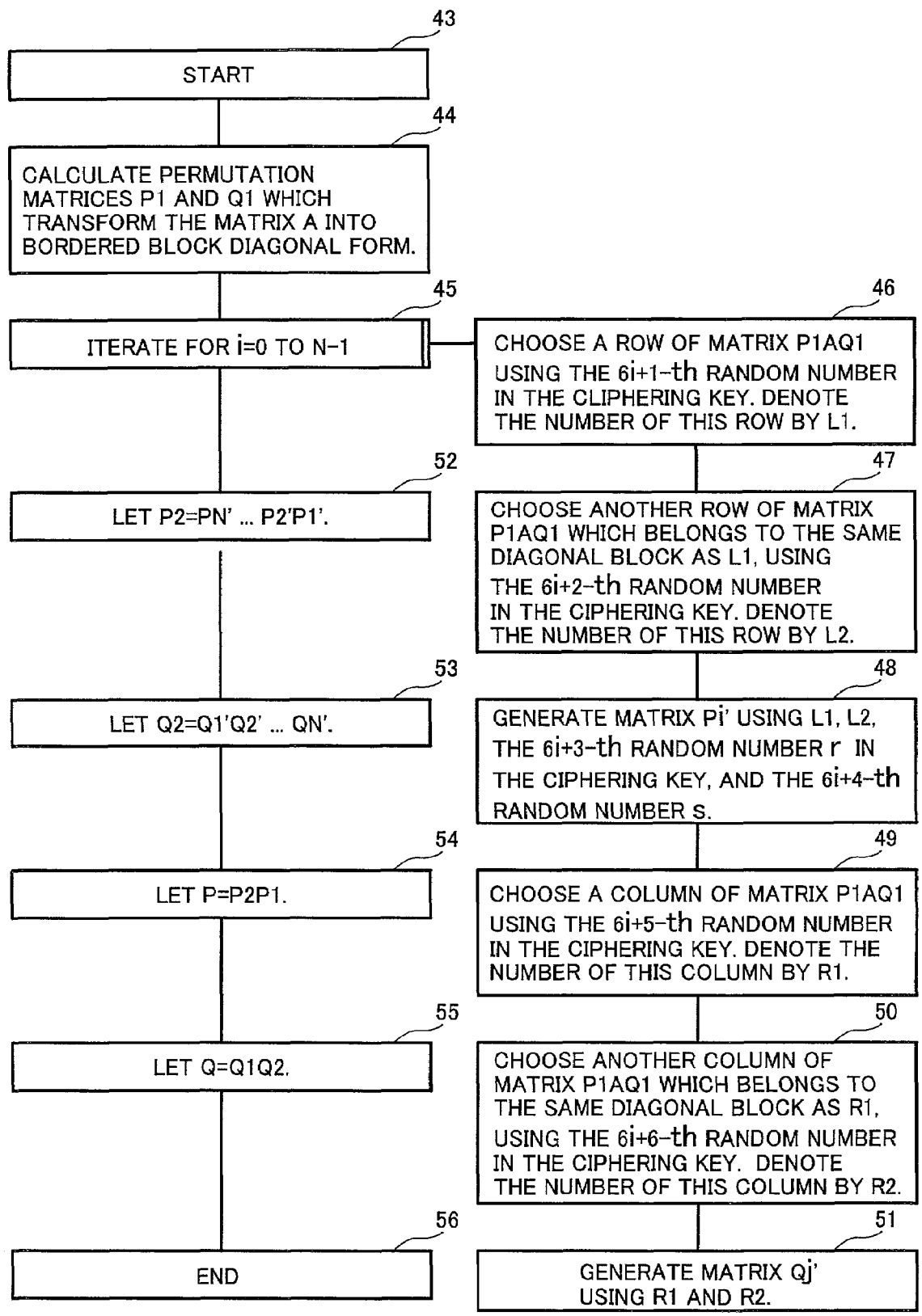
FIG. 9 is a diagram showing a flow chart of an example of processing in a conversion matrix generation routine.

Among the above described processing, there is shown in FIG. 9 an example of processing of the conversion matrix generation routine which generates a nonsingular matrix P having m rows and m columns and a permutation matrix Q having n rows and n columns by using the ciphering key.

As a first step, the conversion matrix generation routine generates a left permutation matrix $P_1$ having m rows and m columns and a right permutation matrix $Q_1$ having n rows and n columns for transforming the coefficient matrix A of the original problem into a bordered block diagonal form (processing 44).

Here, when divided into four blocks longitudinally and laterally, the bordered block diagonal form is such a matrix that a plurality of diagonal blocks exist in a left upper block and nonzero elements exist in only the plurality of diagonal blocks.

By the way, as for blocks other than the left upper block, nonzero elements may be anywhere in the block.

Figure 10:
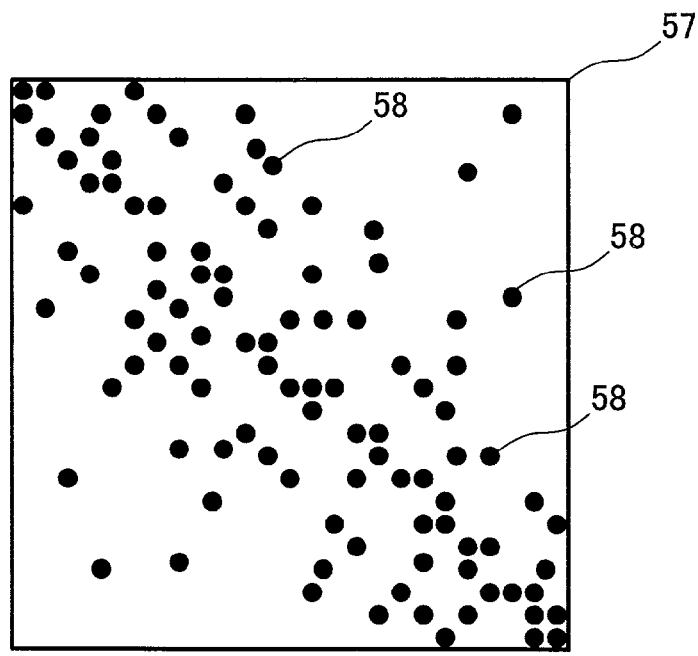
FIG. 10 is a diagram showing an example of a pattern of nonzero elements of a coefficient matrix A.

A pattern of nonzero elements of the original coefficient matrix A is shown in FIG. 10.

Numeral 57 denotes a coefficient matrix, and numeral 58 denotes a nonzero element.

Figure 11:
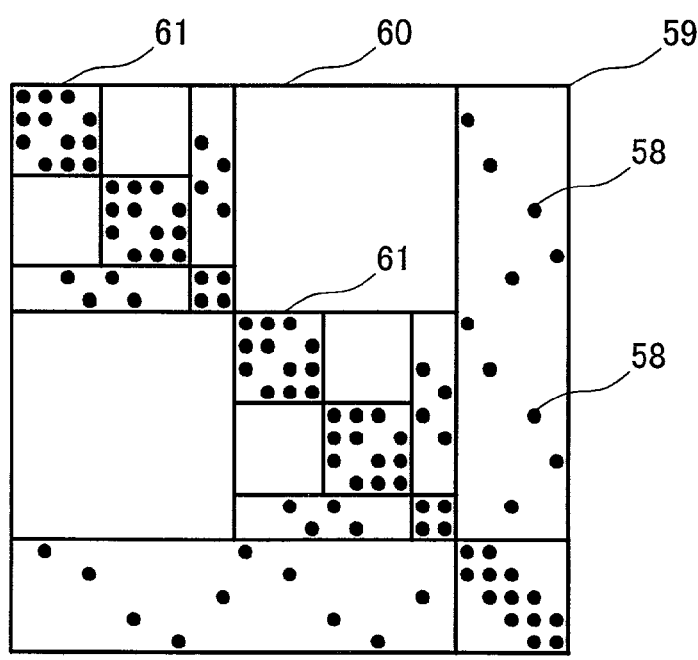
FIG. 11 is a diagram showing an example of a pattern of nonzero elements of a bordered block diagonal form $P_1AQ_1$.

A pattern of nonzero elements of a bordered block diagonal form $P_1AQ_1$ obtained by multiplying A by $P_1$ from the left and by $Q_1$ from the right is shown in FIG. 11.

Numeral 60 denotes a left upper block, and numeral 61 denotes a diagonal block.

It is known that an arbitrary matrix can be transformed into a bordered block diagonal form by using a left permutation matrix and a right permutation matrix. To be concrete, $P_1$ and $Q_1$ can be calculated by using a method called nested dissection method.

Details concerning these points described in, for example, A. Gallivan etc. "Parallel Algorithms for Matrix Computation," SIAM, 1990.

As a second step, the conversion matrix generation routine generates a matrix $P_2$ for conducting linear transformation from the left in each block and a matrix $Q_2$ for conducting linear transformation from the right in each block, by using a ciphering key.

It is now assumed that the cipher is given as a stream of 6N random numbers.

At this time, one row of a matrix $P_1AQ_1$ is first chosen by using a first random number (processing 46). Another row of the matrix $P_1AQ_1$ which belongs to the same diagonal block as the chosen row is chosen by using a second random number (processing 47).

The first chosen row is referred to as $L_1$th row. The second chosen row is referred to as $L_2$th row.

By adding a third random number r to a $(L_1, L_2)$th component of a unit matrix having m rows and m columns and adding a fourth random number s to a $(L_2, L_1)$th component of the unit matrix, a matrix $P1'$ is generated (processing 48).

Multiplying the matrix $P_1AQ_1$ by the matrix $P_1'$ from the left is equivalent to adding r times the $L_2$th row of the matrix $P_1AQ_1$ to the $L_1$th row of the matrix $P_1AQ_1$ and adding s times the $L_1$th row to the $L_2$th row.

Subsequently, one column of the matrix $P_1AQ_1$ is chosen by using a fifth random number (processing 49). Another column of the matrix $P_1 AQ_1$ which belongs to the same diagonal block as the chosen column is chosen by using a sixth random number (processing 50).

The first chosen row is referred to as $R_1$th row. The second chosen row is referred to as $R_2$th row. By setting an $(R_1, R_1)$th component and an $(R_2, R_2)$th component of the unit matrix having n rows and n columns equal to 0 and setting an $(R_1, R_2)$th component and an $(R_2, R_1)$th component of the unit matrix equal to 1, a matrix $Q_1'$ is generated (processing 51).

Multiplying the matrix $P_1AQ_1$ by the matrix $Q_1'$ from the right is equivalent to replacing the $R_1$th column and the $R_2$th column of the matrix $P_1AQ_1$ with each other.

In this way, by using six first random numbers of the ciphering key, $P_1'$ and $Q_1'$ are generated. Thereafter, $P_2'$, $Q_2'$, $P_3'$, $Q_3'$, ..., $P_N'$, $Q_N'$ are generated in the same way by sequentially using random numbers included in the ciphering key (processing 45).

By using them, a matrix $P_2$ and a matrix $Q_2$ are generated according to the relations $P_2=P_N'$ ... $P_2'P_1'$ and $Q_2=Q_1'Q_2'$ ... $Q_N'$ (processing 52 and 53).

Finally, as a third step, the nonsingular matrix P having m rows and m columns and the permutation matrix Q having n rows and n columns are generated by using the relations $P=P_2P_1$ and $Q=Q_1Q_2$ (processing 54 and 55).

The method for generating P and Q heretofore described has the following three advantages.

First, after the matrix is transformed into a bordered block diagonal form, processing of adding a constant times a certain row to another row and replacing columns is conducted only within a diagonal block. Therefore, blocks of zero elements other than the diagonal blocks remain blocks of zero elements without being affected by the operation.

Therefore, the number of nonzero elements of the coefficient matrix is not increased remarkably by the conversion for encipherment.

The amount of calculation for solving an optimization problem increases as nonzero elements of the coefficient matrix increase. This means that the amount of computation for solving the optimization problem is not increased remarkably by encipherment.

Secondly, since arbitrary conversion is possible in the diagonal block, the degree of freedom of the conversion is sufficiently large.

This means that it is difficult to presume the original problem from the converted problem, and assures that the encipherment using the generation method of P and Q has a sufficient strength.

Thirdly, since conversion of the coefficient matrix is conducted by a simple processing combination of the processing of adding a constant times a certain row to another row and processing of replacing columns, the amount of calculation for conversion is sufficiently small.

Therefore, the overhead caused by conducting the encipherment is sufficiently small.

Because of advantages heretofore described, the above described generation method of P and Q has been adopted in the present embodiment. As long as the condition that P is a nonsingular matrix having m rows and m columns and Q is a permutation matrix having n rows and n columns is satisfied, even a matrix generated by using a different generation method can be utilized as a conversion matrix in the present invention.

Heretofore, an embodiment of the present invention has been described in detail. Merits of the present invention can be broadly divided into two categories.

A first merit is that the server side receives only the converted problem and the server does not receive the original problem input by the user, and the ciphering key and the conversion matrices P and Q for restoring the original problem. Therefore, the server cannot receive information of the original problem.

If the scheme of the present invention is utilized, therefore, it becomes possible to request solving even such a problem of extremely high secrecy that it is not desirable to disclose information concerning the original optimization problem to the server side.

Furthermore, even in the case where there is a malicious person in operators of the server or the case where there is invasion to the server, it is possible to prevent information concerning the user's problem from leaking.

A second merit is that it is not necessary to deliver a ciphering key to the server and consequently it is not necessary to send the ciphering key via the network.

In sending the ciphering key, there is usually adopted such a method as to encipher the ciphering key by using a different public key cipher and such a contrivance as to increase the safety is conducted. In the present invention, however, such a labor becomes unnecessary and lowering of the safety caused by the public key cipher being broken can be prevented.

In the present embodiment, the case where there is one client has been described as an example. However, it is evident that the present invention can also be applied to the case where a plurality of clients are connected to the server via a network.

Furthermore, the present embodiment has been described by taking the case where the client and the server send and receive information via the network as an example. However, it is evident that the present invention can also be applied to the case where information is exchanged via a recording medium such as a floppy disk or magnetic tape.

Furthermore, the present embodiment has been described by taking the case where an equality constraint of an optimization problem takes the form of Ax=b and an inequality constraint of the optimization problem takes the form of $x \geq 0$, as an example. However, the principle of the present invention is that an optimization problem is converted into a different optimization problem by combining variable conversion with equivalent transformation of expressions. Such a principle of the present invention can also be applied to a more general optimization problem having an equality constraint $g(x)=0$ and an inequality constraint $h(x) \geq 0$.

Furthermore, the present embodiment has been described with respect to the case where a solution of an optimization problem is found. The present embodiment can also be applied to the case where a solution of a problem other than an optimization problem. For example, the present embodiment can be applied to the case where a solution of simultaneous linear equations is found.

Finally, the present embodiment has been described by taking the case where the converted problem is sent from the client to the server via the network as it is. However, it is also possible to use a conventional encipherment technique, further encipher a problem converted by means of a method of the present invention, then sending the enciphered problem to the server together with a ciphering key, and further increase the safety of information on the network.

A second embodiment of the present invention will now be described.

The present embodiment is a solving service processing method. According to the solving service processing method, a solving system (server) provides a user with a conversion program of encipherment according to the method of the present invention. The user (client) converts an optimization problem into a different problem by using the conversion program. The server receives the resultant different problem, finds a solution thereof, and provides the user with the solution. The user deciphers the solution. Thus the solving system solves the problem without obtaining information concerning the user's optimization problem and its solution before encipherment.

The present solving service processing method is implemented on a system including a client, a server, and a network in the same way as FIG. 6 of the first embodiment.

Processing of the client and the server in the present embodiment is shown in FIG. 12.

The client first issues a service start request to the server (processing 63).

The server receives it (processing 73), and sends a program for problem conversion of encipherment according to the method of the present invention to the client (processing 74).

The client receives the program for problem conversion (processing 64).

Subsequently, the client accepts an optimization problem input by the user (processing 65), and also accepts a ciphering key for encipherment conversion (processing 66).

Thereafter, the client converts the input optimization problem into a different equivalent problem by using the ciphering key and the conversion program received in the processing 64 (processing 67). Details of this conversion have been described in the first embodiment.

The client sends the optimization problem thus converted to the server (processing 68).

The server receives the converted optimization problem (processing 75), finds a solution (processing 76), and sends the solution to the client (processing 77).

The client receives the solution (processing 69), conducts reverse conversion and obtains the solution of the original problem (processing 70), and outputs the solution (processing 71).

Owing to the operation heretofore described, it becomes possible for the server side to conduct solving service of an optimization problem without obtaining information of an original problem input by a user and its solution.

In the present embodiment, the client first issues a service start request to the server, and in response thereto the server sends a conversion program for encipherment. In the case where the present service is utilized on the second time or later, this step may also be omitted.

Furthermore, the client may first accept an optimization problem input by the user, then issue a service start request to the server, and receive a program for conversion.

A third embodiment of the present invention will now be described.

The present embodiment is a solving service processing method. According to the solving service processing method, a solving system (server) specifies a conversion program of encipherment according to the method of the present invention, makes the user (client) obtain the conversion program from a program provider which is a third person and convert an optimization problem into a different problem by using this program, receives the converted problem from the user, finds a solution of the converted problem, provides the user with the solution, and makes the user decipher the solution. As a result, the solving system conducts problem solving without obtaining information of the user's optimization problem and its solution.

The present solving service processing method is implemented on a system including a client, a server, and a network in the same way as FIG. 6 of the first embodiment and further including a program provider who provides a conversion program for encipherment.

Processing of the client, the server and the program provider in the present embodiment is shown in FIG. 13.

The client first issues a service start request to the server (processing 63).

The server receives it (processing 73), and notifies the client of a provider of a conversion program of encipherment according to the method of the present invention (processing 81).

Upon being notified of the program provider (processing 78), the client requests the program provider to send a conversion program (processing 79).

The program provider receives this request (processing 82), and sends the conversion program to the client (processing 83).

The client receives this conversion program (processing 80).

Processing conducted by the client and server after the client has obtained the conversion program is completely the same as that of the second embodiment.

In the case of the present embodiment as well, it becomes possible for the server side to conduct solving service of the optimization problem without obtaining information of the original problem input by the user and its solution.

In the present embodiment, sending of the service start request from the client to the server and notifying the client of the program provider conducted by the server may be carried out by access of the client to a home page of the server.

An example of a screen picture in this case is shown in FIG. 14.

In this example, a home page 84 of the server has an entrance 85 for users who use the service for the first time and an entrance 88 for registered users.

A user who uses the service for the first time first clicks the entrance 85 to jump to a user registration picture, and conducts user registration in the picture.

Subsequently, the user returns to the picture 84, and clicks a link 86 for obtaining a conversion program for ciphering this time.

This link is connected to a home page of the conversion program provider. The user can obtain the conversion program therefrom.

Ensuing processing is the same as that of the second embodiment.

On the other hand, a user who has already utilized this service and obtained the conversion program may click the entrance 88 for registered users and thereby jump directly to a service menu.

It is also possible to provide a link 87 to explanation of the ciphering program on the home page and explain a mechanism and advantages of ciphering according to the present invention ahead of the link 87.

In the present example, the entrance for users who use the service for the first time, the link for obtaining the conversion program and the entrance for registered users appear on one page. Alternatively, they may be disposed distributively on a plurality of pages.

As heretofore described, in the present invention, the server side receives only the converted problem and the server side cannot receive information concerning the original problem. Therefore, it becomes possible to request solving even such a problem of extremely high secrecy that it is not desirable to disclose information concerning the original optimization problem to the server side.

Furthermore, even in the case where there is a malicious person in operators of the server or the case where there is invasion to the server, it is possible to prevent information concerning the user's problem from leaking.

Furthermore, it is not necessary to send a ciphering key via the network. Therefore, such a labor as to encipher the ciphering key by using a different public key cipher when sending the ciphering key is unnecessary. And lowering of the safety caused by the public key cipher being broken can be prevented.

The invention claimed is:

1. An application service provider (ASP) system for providing a solution of an optimization problem, comprising:

a client computer system that accepts a solving request of an optimization problem from a user, and a server system that obtains a solution of the optimization problem, wherein the client computer system executes (1) receiving an optimization problem represented by an equality constraint $Ax=b$ defined by a coefficient matrix A having m rows and n columns and an m-dimensional right hand side vector b, an inequality constraint $x \geq 0$, and an objective function $f(x)$ to be minimized, (2) generating a left permutation matrix $P_1$ having m rows and n columns and a right permutation matrix $Q_1$ having n rows and m columns for transforming the coefficient matrix A of the original problems into a bordered block diagonal form, (3) choosing one row of a matrix $P_1AQ_1$ by using a first random number, choosing another row of the matrix $P_1AQ_1$ which belongs to the same diagonal block as the chosen row by using a second random number where the first chosen row is referred to as $L_1$th row and the second chosen row is referred to as $L_2$th row, adding a third random number r to a $(L_1,L_2)$th component of a unit matrix having m rows and m columns, and adding a fourth random number s to a $(L_2,L_1)$th component of the unit matrix thereby to generate a matrix $P_1$, (4) choosing one column of the matrix $P_1AQ_1$ by using a fifth random number and choosing another column of the matrix $P_1AQ_1$ which belongs to the same diagonal block as the chosen column is chosen by using a sixth random number, where the first chosen row is referred to as $R_1$th row and the second chosen row is referred to as $R_2$th row, thereby to generate a matrix $Q_1'$, (5) generating $P_2'$, $Q_2'$, $P_3'$, $Q_3'$, . . . , $P_n'$, $Q_n'$ by sequentially using random numbers included in a ciphering key, generating a matrix P2 and a matrix Q2 according to the relations $P_2=P_n' \ldots P_2' P_1'$ and $Q_2=Q_1, Q_2' \ldots Q_n'$, and generating a nonsingular matrix P having m rows and m columns and a permutation matrix Q having n rows and n columns by using the relations $P=P_2P_1$ and $Q=Q_1Q_2$, (6) converting said optimization problem into another optimization problem having a different equality constraint (PAQ)y=Pb, a different inequality constraint $y \geqq 0$, and a different objective function f(Qy), by using said nonsingular matrix P and said permutation matrix Q, (7) sending the converted optimization problem to the server system, (8) receiving a solution y of the converted optimization problem from the server system, and (9) reverse converting x=Qy on the solution y by using the matrix Q and thereby finding a solution x of the optimization problem Ax=b, wherein the server system executes (1) receiving the converted optimization problem including the equality constraint (PAQ)y=Pb, the inequality constraint $y \geqq 0$, and the objective function f(Qy), (2) finding a solution y of the converted optimization problem, and (3) sending the solution y to the client computer system.

* * * * *